(12) United States Patent
Chuang (10) Patent No.: US 11,673,438 B2
(45) Date of Patent: Jun. 13, 2023

(54) BICYCLE TIRE REPAIR DEVICE

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 302 days.

(21) Appl. No.: 17/010,947

(22) Filed: Sep. 3, 2020

(65) Prior Publication Data

US 2021/0170814 A1 Jun. 10, 2021

(30) Foreign Application Priority Data

Dec. 4, 2019 (TW) ................................ 108144222

(51) Int. Cl.
*B60C 25/00* (2006.01)
*B29C 73/08* (2006.01)
*B29L 30/00* (2006.01)

(52) U.S. Cl.
CPC .............. *B60C 25/16* (2013.01); *B29C 73/08* (2013.01); *B29L 2030/00* (2013.01)

(58) Field of Classification Search
CPC ...... B62J 11/02; B29C 73/08; B29L 2030/00; B60C 25/16
See application file for complete search history.

(56) References Cited

U.S. PATENT DOCUMENTS

| | | | |
|---|---|---|---|
| 5,329,975 A * | 7/1994 | Heitel | B65D 83/42 261/DIG. 7 |
| 8,707,829 B2 | 4/2014 | Kerner | |
| 10,399,397 B2 | 9/2019 | Kerner et al. | |
| 10,702,982 B2 | 7/2020 | Tsai | |
| 10,940,908 B1 * | 3/2021 | Gu | B29C 73/08 |
| 2011/0284124 A1 | 11/2011 | Huang et al. | |
| 2014/0109728 A1 | 4/2014 | McRorie, III | |
| 2017/0292507 A1 | 10/2017 | Staples | |
| 2018/0141396 A1 * | 5/2018 | Kerner | B60C 25/16 |
| 2019/0077099 A1 * | 3/2019 | Park | B29C 73/06 |
| 2021/0146641 A1 * | 5/2021 | Chuang | B62J 11/22 |

FOREIGN PATENT DOCUMENTS

| | | | |
|---|---|---|---|
| CN | 2533005 Y | | 1/2003 |
| CN | 201693523 U | | 1/2011 |
| CN | 202208337 U | * | 5/2012 |
| CN | 206234415 U | | 6/2017 |
| DE | 3245938 A1 | | 6/1984 |
| TW | M480019 U | | 6/2014 |
| TW | M560407 U | | 5/2018 |

* cited by examiner

*Primary Examiner* — Timothy P. Kelly (74) *Attorney, Agent, or Firm* — Alan D. Kamrath; Karin L. Williams; Mayer & Williams PC (57) ABSTRACT

A bicycle tire repair device has a main body which has a first end forming a working end useful for repairing and fluidly connecting with a tire to be repaired and a second end forming an air inlet end useful for connecting with an object that outputs air. The main body defines a channel between the first and the second ends for allowing the air from the object to flow to the second end. The first end includes a tire repair needle connected therewith.

11 Claims, 7 Drawing Sheets

BICYCLE TIRE REPAIR DEVICE

BACKGROUND OF THE INVENTION

1. Field of the Invention

The present invention relates to a tire repair device and, particularly, to a tire repair device for repairing bicycle tires.

2. Description of the Related Art

Taiwan Pat. No. 1625203 discloses a folding tool kit useful for repairing tires. The folding tool kit includes: a main body with two side plates spaced from each other, a shaft between the two plates, and a wide variety of tools pivotally connected to the shaft. The folding tool kit may be useful, but does not help a user inflate a repaired tire. Although the user can bring along an inflating device or high-pressure gas cylinders with the folding tool kit, it is burdensome.

The present invention is, therefore, intended to obviate or at least alleviate the problems encountered in the prior art.

SUMMARY OF THE INVENTION

A bicycle tire repair device in accordance with the present invention has a main body which has a first end forming a working end useful for repairing and fluidly connecting with a tire to be repaired and a second end forming an air inlet end useful for connecting with an object that outputs air. The main body defines a channel between the air inlet end and the working end for allowing the air from the object to flow to the second end. The first end includes a tire repair needle connected therewith.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

FIGS. 1 through 7 show a bicycle tire repair device 10 in accordance with the present invention.

A main body 20 which has an end 21 forming a working end useful for repairing and fluidly connecting with a tire 91 to be repaired and an end 22 forming an air inlet end useful for connecting with an object 90 that outputs air. The main body 20 extends longitudinally from the end 21 to the end 22 along an axis L. Further, the main body 20 defines a channel 23 between the ends 21 and 22 for allowing the air from the object 90 to flow to the end 22.

The end 21 is selectively connectible with a tire repair needle 30 or a valve 93 of the tire 91 to be repaired. Particularly, the end 21 defines a hole for selectively receiving the tire repair needle 30 or the valve 93 of the tire 91 to be repaired. Further, the tire repair needle 30 is releasably connected with the first end 21. Particularly, the hole of the end 21 has threads 231 and the tire repair needle 30 has threads 311 engagable with the threads 231. Likewise, the valve 93 has threads engagable with the threads 231.

Figure 1:
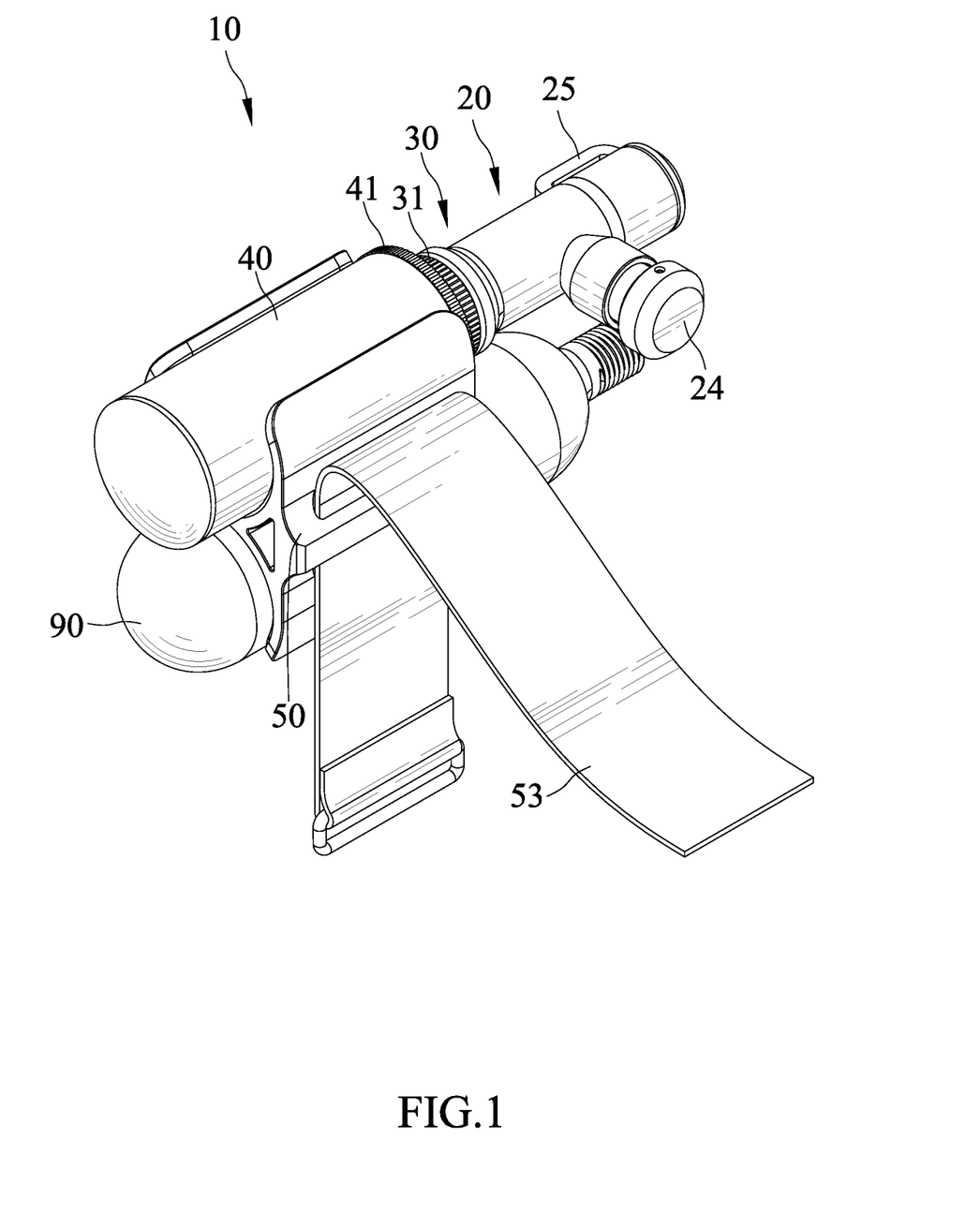
FIG. 1 is a perspective view of a bicycle tire repair device in accordance with the present invention.
Figure 2:
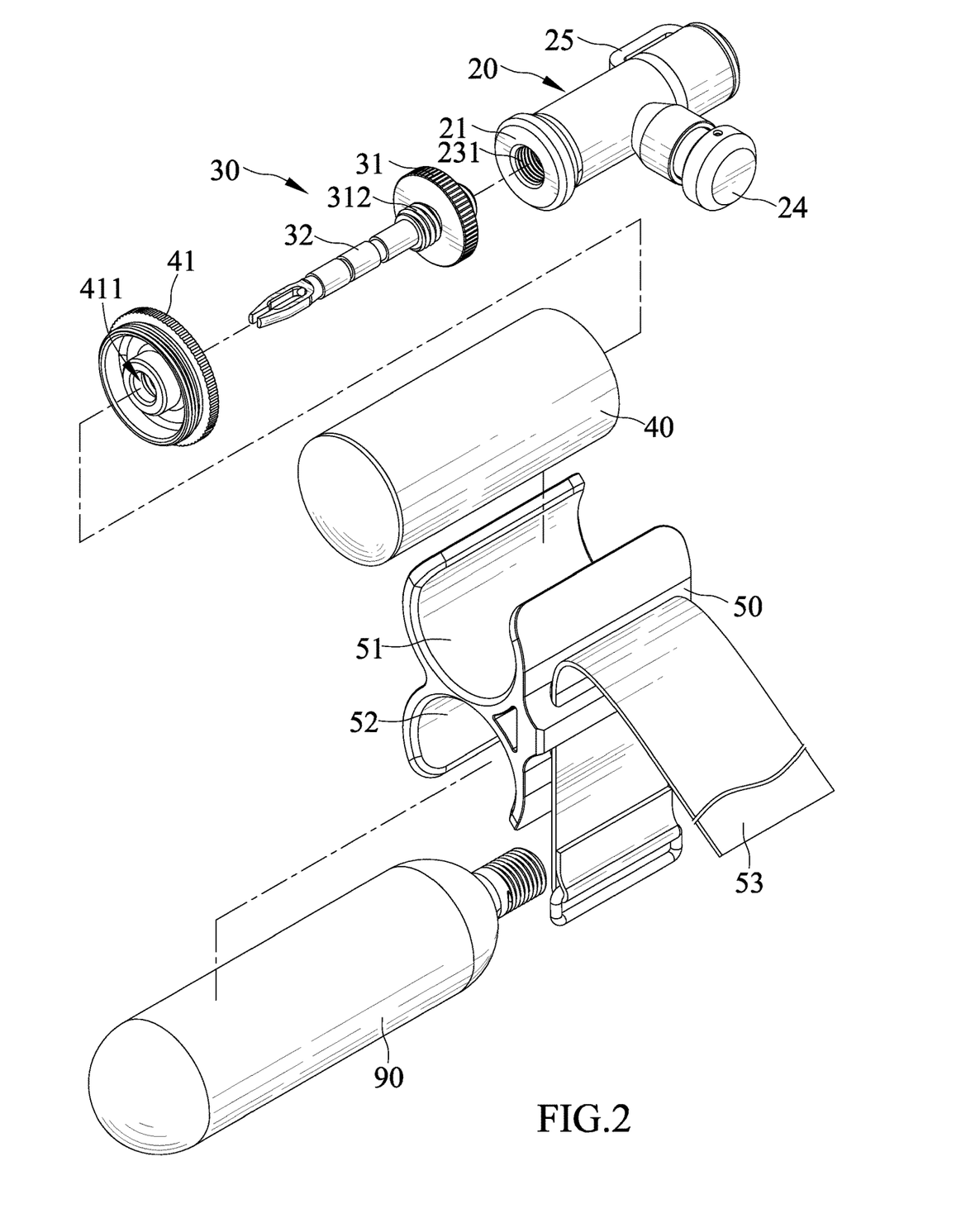
FIG. 2 is an exploded perspective view of the bicycle tire repair device.
Figure 3:
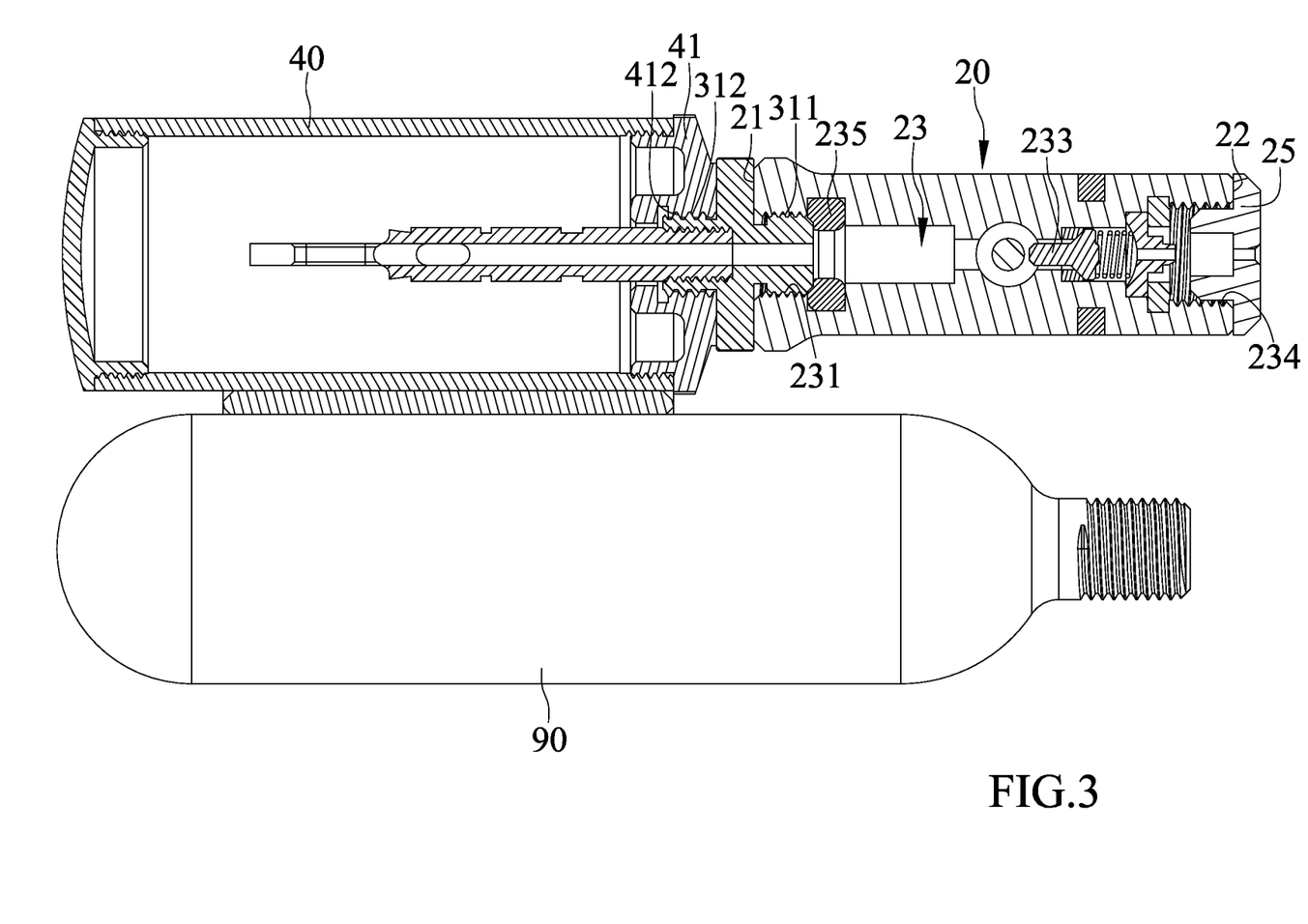
FIG. 3 is a cross-sectional of the bicycle tire repair device.
Figure 4:
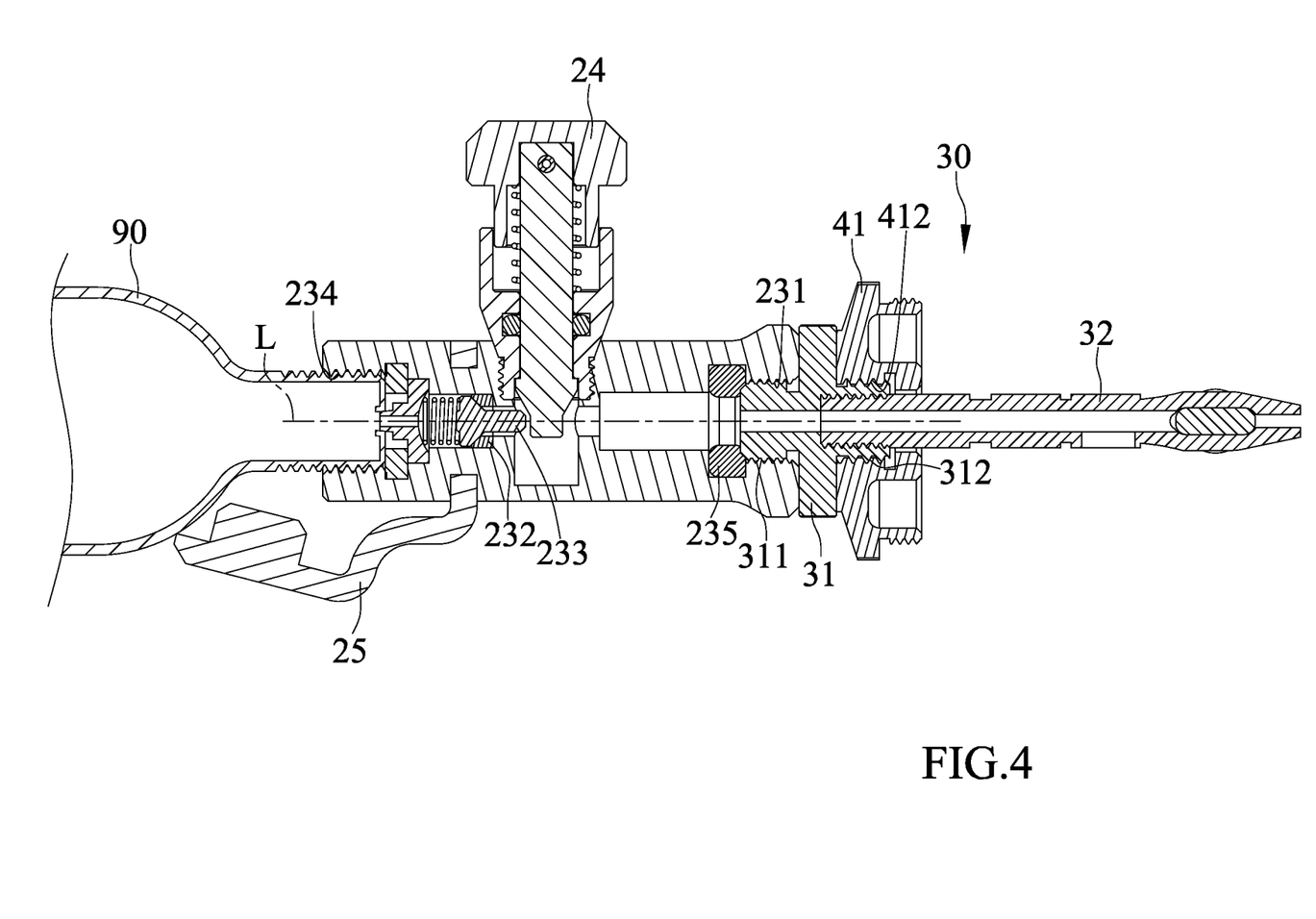
FIG. 4 is a cross-sectional view illustrating the bicycle tire repair device in a position for inserting a repair tire strip into a tire to be repaired.
Figure 5:
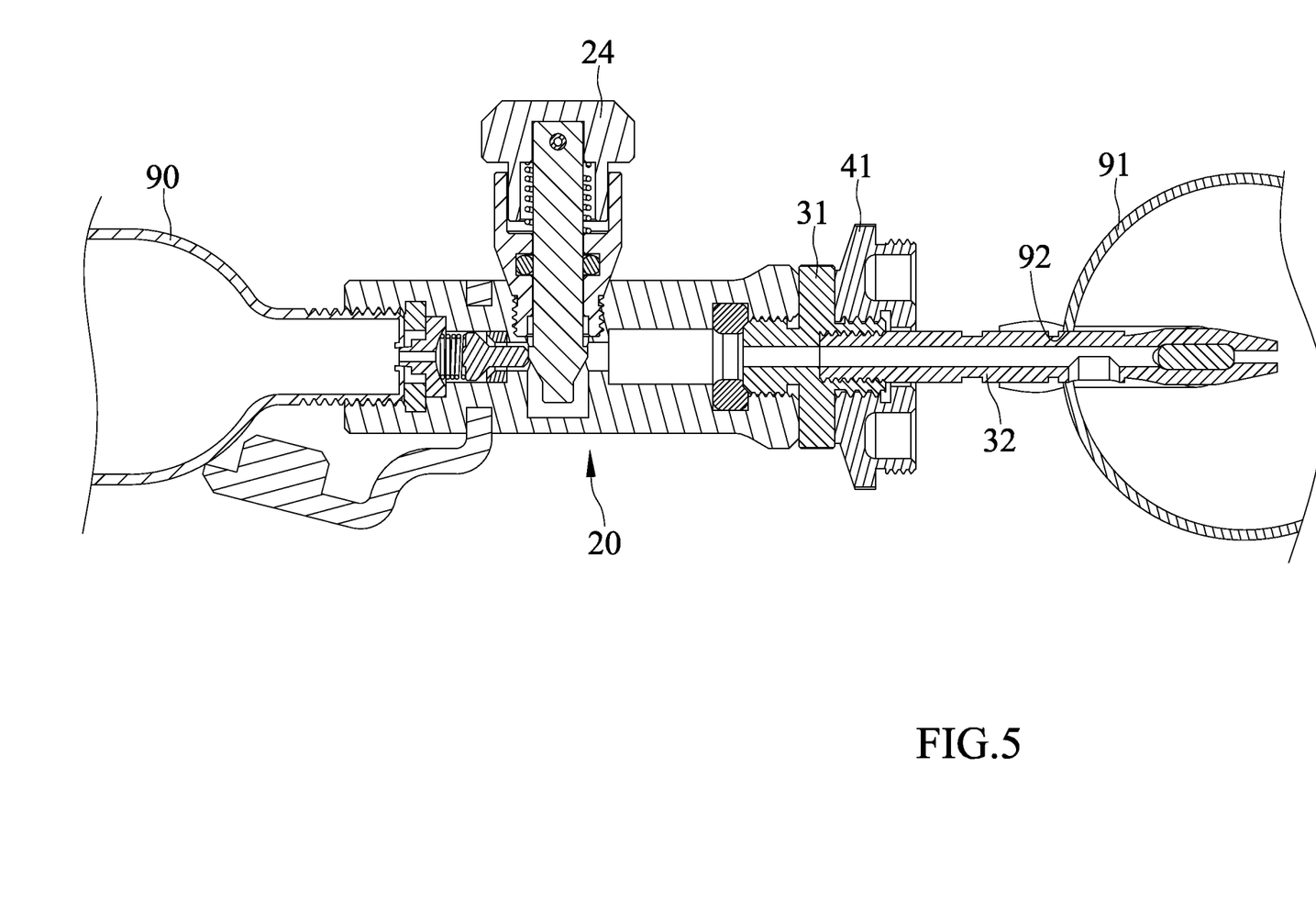
FIG. 5 is a cross-sectional view illustrating the bicycle tire repair device inserting a repair tire strip into a tire to be repaired.

The tire repair needle 30 is configured to hold a tire repair strip and to insert the tire repair strip into the tire 91 to be repaired. The tire repair needle 30 has a body 32 on which the tire repair strip is mounted. The tire repair needle 30 has a flange 31 protruding radially outwardly from the body 32. The flange 31 is disposed outside the main body 20 and abuts against the end 21 of the main body 20 when the tire repair needle 30 is engaged at the end 21 of the main body 20. Accordingly, a user drives the bicycle tire repair device 10 to push the tire repair strip into a puncture 92 of the tire 91 to be repaired until the puncture 92 is sealed.

A sleeve 40 selectively covers and uncovers the body 32 of the tire repair needle 30. The tire repair needle 30 includes a seat 41 on which the sleeve 40 is releasably connected. The seat 41 is releasably connected with the body 32. Particularly, the body 32 has threads 312 and the seat 41 has threads 412 engagable with the threads 312. The seat 41 defines a hole 411 and the body 32 of the tire repair needle 30 is inserted in the hole 411. The sleeve 40 has an open end and the open end is closed by the seat 41.

Figure 6:
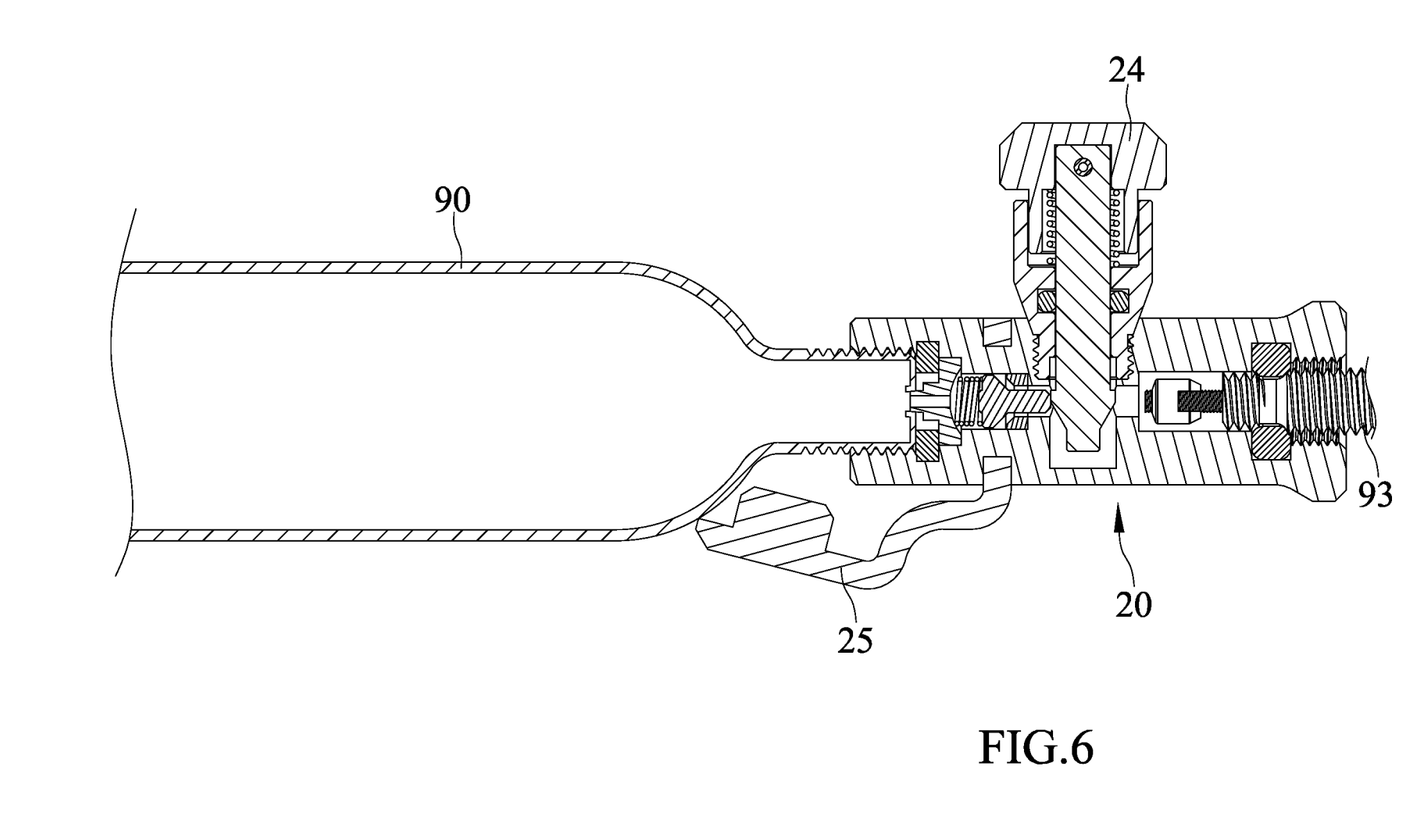
FIG. 6 is a cross-sectional view illustrating the bicycle tire repair device fluidly connected to a valve of the repaired tire for inflating the repaired tire.

The end 22 is connectible with the object 90. Particularly, the end 22 defines a hole for receiving the object 90. Further, the object 90 is releasably connected to the end 22. Particularly, the hole of the end 22 has threads 234 and the object 90, which is a high-pressure gas cylinder, has threads engagable with the threads 234. Additionally, the hole of the end 22 is in fluid communication with the channel 23. Accordingly, the object 90 outputs air to inflate the tire 91 to be repaired through the channel 23.

A block ring 232 is retained in the channel 23 and cooperates with a valve insert 233. The valve insert 233 is movably disposed in the channel 23 and selectively abuts against and detaches from the block ring 232. Further, the valve insert 233 is activated by a release control 24. The release control 24 is movably disposed on the main body 20 and selectively urges the valve insert 233. When the valve insert 233 abuts against the block ring 232, the channel 23 is unable to fluidly interconnect the ends 21 and 22 of the main body 20. The release control 24 is movable between a first position in which the valve insert 233 abuts against the block ring 232 and a second position in which the valve insert 233 detaches from the block ring 232. The release control 24 moves in a first direction and the valve insert 233 moves in a second direction transverse to the first direction. When the release control 24 is in the second position, it urges the valve insert 233 to detach from the block ring 232.

A seal ring 235 is retained in the channel 23 for preventing the air from the object 90 from flowing between the first and the second threads (231, 311).

A plug 25 is configured to keep dirt out of the hole of the end 22 when the object 90 is not connected to the second end 22. The plug 25 is attached to the main body 20.

Figure 7:
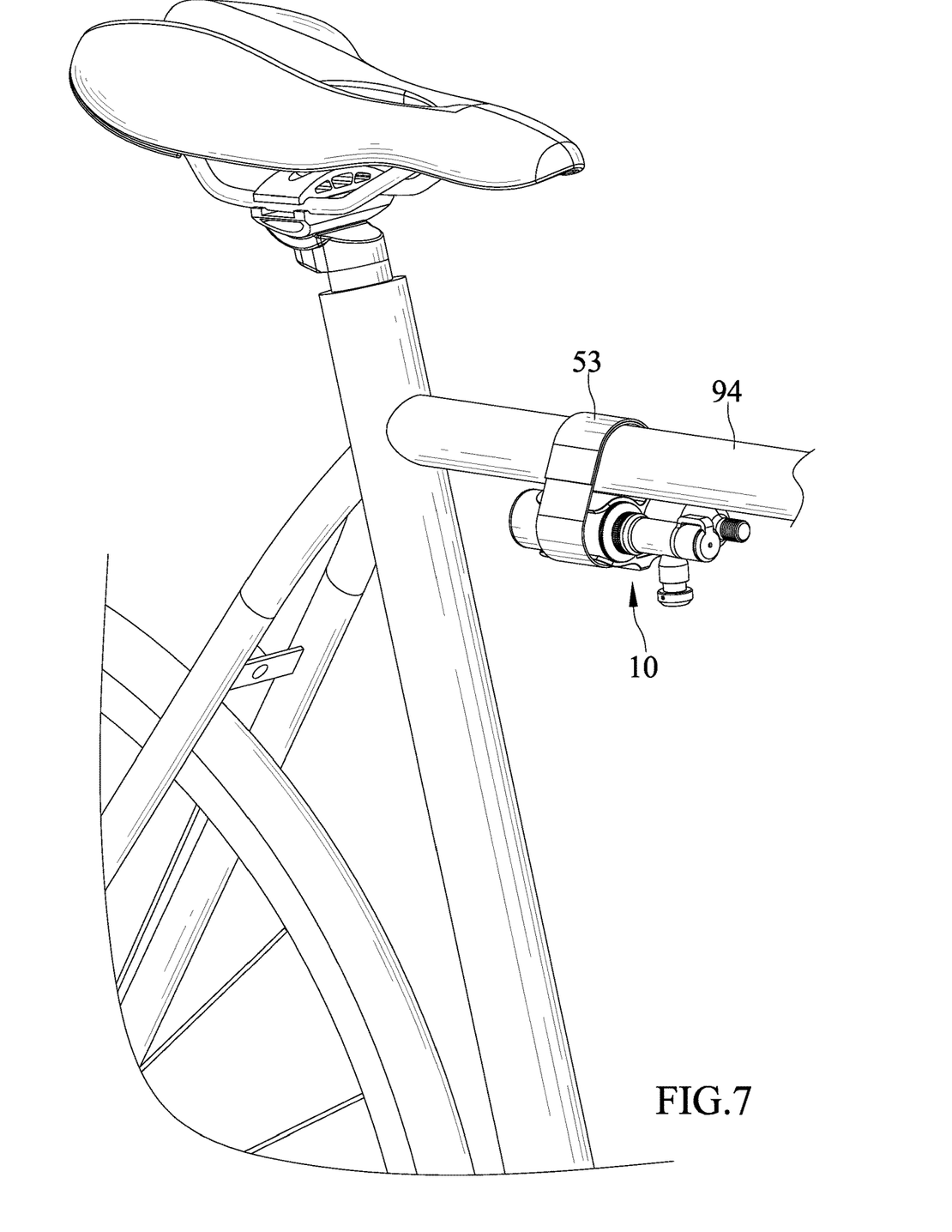
FIG. 7 is a perspective view illustrating the bicycle tire repair device stowed on a bicycle.

A mount 50 is mountable on a bicycle. The mount 50 has an attaching portion 53 for attaching to the bicycle. FIG. 7 shows the mount 50 is attached to a frame 94 of the bicycle. The mount 50 is attached to a top tube of the frame 94 for illustration, but not limited thereto. The attaching portion 53 is a flexible strap. The mount 50 can be attached to the frame 94 by wrapping the attaching portion 53 around the frame 94. The mount 50 has a holding portion 51 for releasably holding the main body 20 and a holding portion 52 for releasably holding the object 90. Particularly, the holding portions 51 and 52 are elastic. More particularly, each of the holding portions 51 and 52 has two distal ends spaced from each other. Therefore, when the mount 50, the main body 20, and the object 90 are to be carried by the bicycle, the mount 50 is attached to the bicycle, the main body 20 is held by the first holding portion 51, and the object 90 is held by the second holding portion 52 respectively.

In view of the foregoing, the bicycle tire repair device 10 allows a user to fix the tire 91 to be repaired conveniently. Further, the bicycle tire repair device 10 is portable and can be attached to the frame 94 of the bicycle.

The foregoing is merely illustrative of the principles of this invention, and various modifications can be made by those skilled in the art without departing from the scope and spirit of the invention.

What is claimed is:

1. A bicycle tire repair device comprising:
  a main body having a first end forming a working end useful for repairing and fluidly connecting with a tire to be repaired and a second end forming an air inlet end useful for connecting with an object that outputs air and defining a channel between the first and the second ends for allowing the air from the object to flow to the second end, wherein the first end includes a tire repair needle connected therewith; and
  a sleeve selectively covering and uncovering a body of the tire repair needle, wherein the tire repair needle includes a seat on which the sleeve is releasably connected, an outer periphery of the seat having a first fastening structure, an inner periphery of the sleeve having a second fastening structure, the first fastening structure of the seat engaged with the second fastening structure of the sleeve when the sleeve is secured to the seat, and wherein the sleeve has an open end and the open end is closed by the seat.

2. The bicycle tire repair device as claimed in claim 1, wherein the first end defines a hole for selectively receiving the tire repair needle or a valve of the tire to be repaired, and wherein the hole of the first end has first threads and the tire repair needle has second threads engagable with the first threads.

3. The bicycle tire repair device as claimed in claim 1, wherein the tire repair needle is configured to hold a tire repair strip and to insert the tire repair strip into the tire to be repaired, wherein the tire repair strip is mounted on the body of the tire repair needle, wherein the tire repair needle has a flange protruding radially outwardly from the body, and wherein the flange is disposed outside the main body and abuts against the first end of the main body when the tire repair needle is engaged at the first end of the main body.

4. The bicycle tire repair device as claimed in claim 1, wherein the seat is releasably connected with the body, and wherein the seat defines a hole and the body of the tire repair needle is inserted in the hole.

5. The bicycle tire repair device as claimed in claim 1 further comprising
  a mount mountable on a bicycle, wherein the mount has an attaching portion for attaching to the bicycle, wherein the mount has a first holding portion for releasably holding the main body and a second holding portion for releasably holding the object, and wherein when the mount, the main body, and the object are to be carried by the bicycle, the mount is attached to the bicycle, the main body is held by the first holding portion, and an outer periphery of the middle of the object is held by the second holding portion respectively.

6. The bicycle tire repair device as claimed in claim 5, wherein the first and the second holding portions are elastic.

7. The bicycle tire repair device as claimed in claim 6, wherein each of the first and the second holding portions has two distal ends spaced from each other.

8. The bicycle tire repair device as claimed in claim 1 further comprising a block ring retained in the channel, a valve insert movably disposed in the channel and selectively abutting against and detaching from the block ring, and a release control movably disposed on the main body and selectively urging the valve insert, wherein when the valve insert abuts against the block ring, the channel is unable to fluidly interconnect the first and the second ends of the main body, and wherein the release control is movable between a first position in which the valve insert abuts against the block ring and a second position in which the valve insert detaches from the block ring.

9. The bicycle tire repair device as claimed in claim 2 further comprising a seal ring retained in the channel for preventing the air from the object from flowing between the first and the second threads.

10. The bicycle tire repair device as claimed in claim 5, wherein the attaching portion is a flexible strap.

11. The bicycle tire repair device as claimed in claim 5, wherein the tire repair needle is configured to hold a tire repair strip and to insert the tire repair strip into the tire to be repaired, wherein the tire repair needle has a body on which the tire repair strip is mounted, wherein the tire repair needle has a flange protruding radially outwardly from the body, and wherein the flange is disposed outside the main body and abuts against the first end of the main body when the tire repair needle is engaged at the first end of the main body.

* * * * *